United States Patent Office 2,840,264
Patented June 24, 1958

2,840,264

POLYAMIDE RESIN COMPOSITION AND METHOD OF PREPARING SAME

James H. Groves, Barrington, Ill., assignor to American Can Company, New York, N. Y., a corporation of New Jersey No Drawing. Application October 8, 1957
Serial No. 688,843

8 Claims. (Cl. 220—81)

The present invention relates to a novel synthetic resin composition and the method of its preparation. More specifically, this invention relates to an adhesive composition derived from two linear polyamide resins and the method of preparing the same.

The instant application is a continuation-in-part of my co-pending application, S. N. 385,887, filed October 13, 1953, now abandoned.

I have discovered that when a hard, tough and brittle polyamide resin made from the copolymerization of an alkylene diamine with certain saturated and unsaturated organic acids is combined in specific proportions with a soft, tacky polyamide resin made from the copolymerization of a polyalkylene polyamine with certain saturated and unsaturated organic acids and this combination of polyamide resins is subjected to heat treatment under controlled conditions, a homogeneous resin composition is produced which at room temperature is very tough, flexible, resistant to solvents and has excellent cohesive and adhesive properties.

An object of the present invention is the preparation of a novel polyamide resin composition.

Another object is the provision of a heat stable, homogeneous composition derived from two different polyamide resins combined in specific proportions.

Yet another object of the invention is the provision of a tough, rubbery composition having excellent properties of solvent resistance and adhesion for bonding wood, metal, fibre and other materials.

A further object is the provision of a method of preparing a heat stable, homogeneous polyamide resin composition having superior properties as an adhesive.

Numerous other objects and advantages of the invention will be apparent as it is better understood from the following description which is of a preferred embodiment thereof.

Combinations of the soft, flexible, tacky polyamide resin and the tough chemically resistant though brittle polyamide resin are particularly well suited for use as hot melt cements or adhesives. The two resins are compatible and each confers some desirable properties to the resulting blend. However, such blends change in melting point when held molten for appreciable periods of time. In many industrial applications a change in the melting point of such a hot melt cement or adhesive causes considerable trouble because the "set time" therefore varies considerably. If the material is applied at 370° F. and the melting point of the blend is 350° F., a relatively small loss of heat will cause the hot melt adhesive to set and to be an effective bonding agent. If, however, the melting point is 330° F. a greater heat loss must occur and, therefore, a longer time must elapse, before the cement sets and can bond the surfaces to be joined. A drift in the melting point is particularly troublesome when the cement is applied by automatic devices and the parts to be joined are brought into junction by mechanically timed devices at high rates of speed and when the successive parts to be joined follow one another at very short intervals. Any change in melting point results in reduced efficiency of the operation because of premature or late setting or solidification with consequent failures to bond properly.

After extensive experimentation and testing, I discovered that holding a composition containing a major portion of one of the polyamide resins and a minor portion of the other at a critical temperature above the melting point of the original composition for a critical period of time, yielded a product that has a substantially stable melting point even when in a molten state for extended periods of time. A completely surprising and unexpected result, in addition to the stabilization of the melting point, is that the heat treated product of the present invention when solidified is considerably more resilient and tougher and becomes a substantially better adhesive then the comparable non-heat treated resin composition.

My compositions are well suited as bonding materials for interfolded side seams of sheet metal containers including uncoated steel, i. e. black plate, and steel having an organic or metal, e. g. tin, coating thereover. Excellent bonds are also produced between aluminum, copper and bronze surfaces. The cohesive strength of my resin compositions and their adhesive strength to metals are sufficiently great to enable these compositions to be a satisfactory substitute for metallic solder as the bonding agent in the side seam of a metal can.

Each of the polyamide resins useful in the present invention are prepared, at least in part, from polymeric fat acids. These polymeric fat acids may be either saturated or unsaturated and may be derived by the thermal polymerization or catalytic polymerization of higher fatty acids such as those having 12 to 22 carbon atoms. Acids derived from drying or semi-drying oils are especially suitable and include soybean, linseed, tung, perilla, oiticia, cottonseed, corn, tall, sunflower, safflower, dehydrated castor oil acids and the like. Linoleic acid is widely available from natural sources and is especially suitable for preparation of polymeric fat acid. Mono-olefinic acids such as oleic may also be dimerized for this purpose but usually by a catalytic process.

The polymeric fat acids usually obtained from a mixture of fat acids will be composed of a very large proportion of dimeric fat acids together with some higher polymeric fat acids and some residual monomer. Some monomer is desirable in the mixed acids for the purpose of controlling polymer size in the polyamide reaction. Monomer may be either removed from the polymeric fat acids or added thereto until a desired quantity is present.

For the purpose of simplicity, the polyamide resins useful in the present invention will be designated and referred to hereinafter as resin A and resin B.

RESIN A

Resin A is a condensation product of polymeric fat acids and a polyalkylene polyamine. Suitable polyalkylene polyamines include diethylene triamine, triethylene tetramine, tetraethylene pentamine, 3,3'-imino-bispropylamine, and the like. Thus these polyalkylene polyamines contain two primary amine groups and from 1 to 3 secondary amine groups, all separated by short chain alkylene groups having 2 to 4 carbon atoms. The ratio of equivalents of polyamine to equivalents of carboxyl should be such that cross linking and hence gelation are avoided. For example in the case of diethylene triamine a ratio of 1.5 equivalents of amine to 1 equivalent of carboxyl is preferred, taking into account the total carboxyl in the polymeric fat acid mixture including the monomer as well as the higher polymers present. In the case of triethylene tetramine a higher amine ratio such as 2.6 equivalents of amine per equivalent of carboxyl is preferred. In general, the higher the amine functionality of the polyamine the higher the ratio of amine equivalents per carboxyl equivalent that is required to produce a non-gelling polyamide. Accordingly, the particular excess of amine to be employed in each instance can readily be determined. Usually it is not necessary to go outside the range of 1.3 to 3.0 equivalents of amine per equivalent of carboxyl.

At room temperature these resins are soft, tacky and resistant to greases, oils, water, water vapor, alkali, can-packing brines and syrups, and a number of organic solvents. The resins have an average molecular weight within the range of 2,500 to 6,500 and an acid number usually below 10.

The following is example of the preparation of a specific resin A. However, this example is not to be considered as a limitation of the invention merely an explanation for the better understanding thereof.

*Example 1*

1305 parts of dimerized linoleic acid and 130.5 parts of monomeric cottonseed fatty acids are uniformly blended in a suitable reaction vessel. The temperature of the mixed acids are then raised about 266° F. and 277 parts of 92.6% diethylene triamine is added. At atmospheric pressure and with constant agitation the temperature of the reaction mass is again elevated to about 392° F. and maintained at this temperature for two hours. A vacuum is then drawn on the vessel and the reaction is continued at 392° F. for an additional hour at the reduced pressure. Thereafter the heating is discontinued and the vacuum is broken with an inert gas. The finished product may be maintained in the reaction vessel for subsequent use or can be poured into suitable containers to cool and solidify.

This resin has a maximum acid number of 12. The specific gravity is about 0.987 and the average molecular weight is between 3,000 to 6,500. Its minimum softening or melting point as measured by the ball and ring test (A. S. T. M.) is about 109° F. When measured as a 35% solution in a 1 to 1 mixture of butanol and toluene it has a maximum Gardner-Holdt viscosity of C.

The typical condensation reaction by which resin A is made may be generally expressed as:

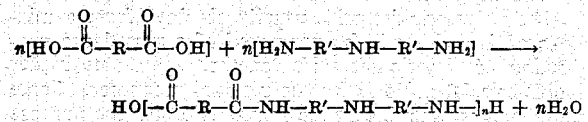

where R is the hydrocarbon portion of dimerized fat acid, R' is an alkylene group having 2 to 4 carbon atoms, and $n$ is about from 4 to 11.

RESIN B

Resin B is a high-melting brittle polyamide resin derived from a mixture of polymeric fat acids similar to those used in preparing resin A and an additional polycarboxylic acid, the latter having at least 2 carboxyl groups which are separated by at least 3 and not more than 8 carbon atoms. Typical of such polybasic acids are the aliphatic acids, glutaric, adipic, pimelic, suberic, azelaic, and sebacic, and the aromatic acids, terephthalic and isophthalic acids. Instead of the free acids, the lower aliphatic esters or the anhydrides of the polycarboxylic acid having a 3 to 8 carbon atom alkylene group may be used. The melting point of the copolymer resin may vary within the range of 265–410° F. depending upon the particular relative reactant ratios as well as reaction conditions. Desirable copolymers from adipic acid melt at 392–401° F.; from sebacic acid at 338–374° F.; and from terephthalic acid at 329–338° F. In general these copolymer polyamide resins B are prepared from a mixture of polycarboxylic acids containing from 85–98% by weight of fatty polymeric acids and from 2–15% by weight of the additional polycarboxylic acids.

In the preparation of resin B the mixture of polybasic acids is reacted with an alkylene diamine in which the alkylene radical has from 2 to 4 carbon atoms such as ethylene diamine; 1, 2- and 1,3-diamino-propane; 1,2-, 1,3-, and 1,4-diamino-butane, and the like. The reactants are mixed in approximately equivalent quantities and heated under essentially the same conditions as have been described for resin A.

Resin B at room temperature is a very hard copolymer which has good resistance to greases, oils, water and water vapor, alkalies, mild acids, can-packing brines and syrups, alcohols, and most organic solvents. The average molecular weight of resin B is from 7,000 to 10,000.

The following is an example of the preparation of a specific resin B. As with the specific example of resin A, the following example should not be interpreted as a limitation of the present invention, merely as an explanation thereof.

*Example 2*

In a suitable reaction vessel a uniform blend of acids containing 288.2 parts of dimerized linoleic acid, 31.7 parts of monomeric cottonseed fatty acids and 31.7 parts of sebacic acid is raised to a temperature of about 266° F. To this heated blend of acids is added 57 parts of 74.5% ethylene diamine and the whole mixture is elevated to a temperature of about 392° F. The reaction mass is preferably agitated to insure intimate contact of the several ingredients. This intimate mixture is maintained at the elevated temperature at atmospheric pressure for about two hours. Thereafter a vacuum is drawn on the vessel and the mass is held at the same elevated temperature for an additional hour under the reduced pressure. The vacuum is then broken with an inert gas and the application of heat discontinued. The finished resin product may be then filled into suitable containers and allowed to cool.

This resin has a maximum acid number of 15 and a specific gravity of about 0.966. Its minimum softening or melting temperature as measured by the ball and ring test (A. S. T. M.) is about 343° F. A 25% solution of resin B in a 1 to 1 mixture of butanol and phenol has a viscosity of A to C on the Gardner-Holdt scale.

The general reaction shown for resin A may also be applied to resin B except an alkylene diamine is substituted for the dialkylene triamine used for resin A and $n$ is about from 12 to 17.

Although the reaction causing the melting point drop of the polyamide resin blends is not completely understood, it is known to be an amide interchange reaction between the different, nitrogen-containing portions of the resin A and resin B molecules. By this reaction the original components of the composition react with one another forming new compounds which produce a composition having different properties from the original combination.

In this reaction it is believed that some of the alkylene diamine groups of resin B interexchange with some of the polyalkylene polyamine groups of resin A. This exchange of amines between resin A and resin B takes place in two stages. Stage one is believed to be the exchange of the end group amines and takes place rapidly at temperatures above about 392° F. The reaction occurring during stage one continues until the exchange of available end group amines reaches an equilibrium which can be called exchange equilibrium. During the stage one reaction the melting point of a blend of resin A and resin B drops rapidly. The end point of this reaction is evidenced by a sharp decline in the rate of reaction or, as a more commonly used reference, by a sharp break or leveling off in a curve obtained by plotting, on rectangular coordinates, Ball and ring melting points against time. As indicated by this last mentioned curve, at the end of the stage one reaction the melting point decline of the composition has substantially ceased and a composition having a relatively stable melting point is obtained.

Stage two of the reaction is believed to be an exchange of the internal amine groups in the resin A and resin B molecules. This exchange of internal amines does not take place as readily as the exchange of terminal amine groups. Thus after the completion of the stage one reaction, the melting point of the blend held in a molten state drops very slightly over a period of time.

In carrying out the process of the present invention resin A and resin B are combined in the appropriate ratio and intimately mixed to insure a uniform, homogeneous blend when molten. Thereafter the homogeneous blend of the two resins is maintained at a temperature above the melting point of the original composition for a time sufficient to effect stage one of the amide interchange reaction whereby the melting point of the composition is stabilized.

For the adhesive composition of the present invention having the desirable properties and utility disclosed herein, the operable weight ratios of the two polyamide resins were found to be in the range of from 50/50 to 75/25 resin A to resin B respectively and preferably a ratio of 65/35 resin A to resin B. After extensive experimentation, it was found that if the amount of resin A is greater than 75% of the composition, the resulting adhesive is too soft and lacks sufficient cohesive strength; and if the amount of resin A is less than 50% of the composition, the resulting adhesive is brittle and fractures easily.

The blending operation may be carried out in many ways, it being necessary only that an intimate, homogeneous blend of the two resins may be obtained. For example, a satisfactory blend can be made by adding resin A to molten resin B. I have found it more practical however to add resin B to molten resin A since it is difficult and time consuming to melt the solid resin B separately without the accompanying danger of localized overheating.

The preferred method of blending the two resins is by adding pieces, egg size or smaller, of resin B to molten resin A held at a temperature at or above 400° F. Agitation of the mixture is required to insure that a homogeneous blend is obtained. In order to prevent oxidative deterioration of the resins they are blanketed by an inert atmosphere such as nitrogen or carbon dioxide while they are maintained at these elevated temperatures.

Satisfactory blending can be accomplished at temperatures from 400° F. to 550° F. and preferably from 400° F. to 420° F. If blending is done below 400° F. the components lack sufficient fluidity for intimate mixing whereby a non-homogeneous composition results. When such non-homogeneous blends are then held molten at temperatures close to the melting point of the composition, the higher melting aggregates of resin B have a tendency to separate and form gel particles in the mass. If too high a temperature is maintained during blending, the first portions of resin B to melt take part in the amide interchange reaction to an excessive degree before the entire amount of resin B added becomes molten.

During the blending operation, it is necessary only to allow sufficient time to insure a homogeneous blend. Under this condition, the time interval is dependent upon the temperature of blending, the size of the resin B pieces added and the efficiency of agitation. I have found that by adding egg size or smaller pieces of resin B to molten resin A at about 400° F. using a mechanically operated agitator, a time interval of about 30 to 60 minutes is sufficient.

In the heat treating operation, both the temperature and time thereof are controlled by the stage one rate of the amide interchange reaction. I have discovered that the reaction proceeds quite slowly below 392° F. and too rapidly to be followed or controlled at temperatures above 450° F. About 16 hours is needed to complete the reaction at 392° F. while at 450° F. a time of about one hour is sufficient. Therefore, a range of from 392° F. to 450° F. and preferably about 425° F. is required for the heat treatment of the resin blend.

The original melting point of blends of resin A and resin B within the scope of my invention varies over a range of about 340° F. to about 360° F. In carrying out the heat treatment, the blend is held with agitation between 392° F. and 430° F. to effect the amide interchange reaction with its resulting melting point drop of the blend. A sample is withdrawn from the reaction vessel about every fifteen minutes during the process and a ball and ring melting point determination taken thereof to follow the course of the reaction as indicated by the melting point drop. This procedure is continued until it is found that the rate of drop of the melting point has decreased sharply. This usually occurs when the melting point of the composition has reached about 325° F. Heating is then discontinued and the resin composition is removed from the reaction vessel and packaged for subsequent use.

The following example is for the purpose of specifically showing my invention and is not intended as a limitation thereon. The resin A and resin B disclosed in this example are the specific resin and resin B set forth in Examples 1 and 2 respectively.

*Example 3*

Into a suitable reaction kettle equipped with a mechanical agitator and means for excluding atmospheric air 39 pounds of resin A were charged. The charge was then blanketed with an atmosphere of nitrogen and heat applied to the kettle to raise the temperature of the charge to 420° F. When the resin A became sufficiently fluid, at approximately 200° F., the agitator was started. Upon reaching the 420° F. temperature, 21 pounds of resin B reduced to egg size or smaller pieces were charged into the kettle while maintaining the inert atmosphere and agitation. Elapsed reaction time is measured from this point.

This blend of resin A and resin B was found to have an original ball and ring melting point of 353° F. After about 30 minutes the blend appeared to be homogeneous and a sample of this blend was found to have a ball and ring melting point of 350° F. The temperature of the mass was maintained at about 424° F. with constant agitation and samples were taken every fifteen minutes to determine the ball and ring melting point thereof. The results are tabulated as follows:

|  | B. & R. M. P., °F. |
|---|---|
| 45 minutes | 347 |
| 60 minutes | 345 |
| 75 minutes | 340 |
| 90 minutes | 335 |
| 105 minutes | 330 |

At this point the reaction had nearly reached exchange equilibrium as indicated by previously established ball and ring melting point vs. time curves referred to hereinbefore and heating was discontinued and drumming off of the composition begun. The drumming off consumed an additional thirty-five minutes during which time the temperature of the blend dropped to about 400° F. A ball and ring melting point determination taken of this drummed off blend showed it to be 323° F. thereby indicating that the rate of drop of the melting point had decreased sharply and that the first stage of the amide interchange reaction had reached equilibrium.

The following table lists the differences between a heat treated and non-heat treated blend containing 65 parts of the resin A of Example 1 and 35 parts of the resin B of Example 2. The melting point change data given below was determined at 370° F. since this is the temperature at which the composition of the present invention is applied commercially as an adhesive. By the following comparison it is obvious that the heat treatment disclosed herein yields a product different from and superior to the non-heat treated, simple combination of resin A and resin B.

| Property | Heat Treated | Non-Heat Treated |
|---|---|---|
| Ball and Ring Melting Point in ° F | 310-325 | 340-360 |
| Rex Hardness at 70° F | 85 | 90 |
| Peel Strength at 180° angle of bonded sheet metal strips pulled over rollers in pounds per ¼ lineal inch | 38.5 | 33.8 |
| Mooney Viscosity at 190° F | 36 | 28 |
| Mooney Elastic Recovery at 190° F | 38 | 15 |
| Impact Resistance of Free Film at room temperature in ft. pounds | 1.8 | 1.3 |
| Rate of melting point decline in degrees per hour when held at 370° F | 1 | 5 |

From the above it can be seen that: the peel strength is increased approximately 15%; resistance to fracture under impact is improved approximately 40%; elasticity and toughness as shown by Mooney elastic recovery and Mooney viscosity are improved approximately 150% and 29% respectively; flexibility is improved as shown by a decrease of 5 of the Rex Hardness; and the stability of the melting point is greatly improved.

It is thought that the invention and many of its attendant advantages will be understood from the foregoing description and that various changes and modifications may be apparent to one skilled in the art without departing from the spirit and scope of the invention or sacrificing its material advantages, the form hereinbefore described being merely a preferred embodiment thereof.

I claim:

1. A resin composition comprising the reaction product of about 50% to 75% of a polyamide resin A consisting essentially of the polyacyl groups of a polymeric fat acid and the polyamino groups of a polyalkylene polyamine having terminal primary amino groups, and about 25% to 50% by weight of a polyamide resin B consisting essentially of the mixed polyacyl groups of a polymeric fat acid and a 3 to 8 carbon atom dicarboxylic acid free from ethylenic unsaturation and the diamino groups of an alkylene diprimary diamine, said mixed polyacyl groups resulting from a ratio of 85% to 98% by weight of said polymeric fat acid to 2% to 15% by weight of said dicarboxylic acid, said reaction product being formed by mixing and maintaining said polyamide resins A and B at a temperature of about 392° F. to 450° F. for a time of about 1 to 16 hours, the longer time being used with the lower temperature.

2. A resin composition comprising the reaction product of about 50% to 75% by weight of a polyamide resin A consisting essentially of the polyacyl groups of a polymeric fat acid and the triamino groups of a dialkylene triamine having terminal primary amino groups, and about 25% to 50% by weight of a polyamide resin B consisting essentially of the mixed polyacyl groups of a polymeric fat acid and a 3 to 8 carbon atom dicarboxylic acid free from ethylenic unsaturation and the diamino groups of an alkylene diprimary diamine, said mixed polyacyl groups resulting from a ratio of 85% to 98% by weight of said polymeric fat acid to 2% to 15% by weight of said dicarboxylic acid, said reaction product being formed by mixing and maintaining said polyamide resins A and B at a temperature of about 392° F. to 450° F. for a time of about 1 to 16 hours, the longer time being used with the lower temperature.

3. A resin composition comprising the reaction product of about 50% to 75% by weight of a polyamide resin A consisting essentially of the polyacyl groups of a polymeric fat acid and the triamino groups of diethylene triamine, and about 25% to 50% by weight of a polyamide resin B consisting essentially of the mixed polyacyl groups of a polymeric fat acid and sebacic acid and the diamino groups of ethylene diamine, said mixed polyacyl groups resulting from a ratio of 85% to 98% by weight of said polymeric fat acid to 2% to 15% by weight of said sebacic acid, said reaction product being formed by mixing and maintaining said polyamide resins A and B at a temperature of about 392° F. to 450° F. for a time of about 1 to 16 hours, the longer time being used with the lower temperature.

4. A resin composition comprising the reaction product of about 50% to 75% by weight of a polyamide resin A consisting essentially of the polyacyl groups of dilinoleic acid and the triamino groups of diethylene triamine, and about 25% to 50% by weight of a polyamide resin B consisting essentially of the mixed polyacyl groups of dilinoleic acid and sebacic acid and the diamino groups of ethylene diamine, said mixed polyacyl groups resulting from a ratio of about 90% by weight of said dilinoleic acid to about 10% by weight of said sebacic acid, said reaction product being formed by mixing and maintaining said polyamide resins A and B at a temperature of about 424° F. for a time of about 1 hour, 45 minutes and for an additional 35 minutes while said temperature decreases to about 400° F.

5. A process comprising intimately blending about 50% to 75% of a polyamide resin consisting essentially of the polyacyl groups of a polymeric fat acid and the polyamino groups of a polyalkylene polyamine having terminal primary amino groups, and about 25% to 50% by weight of a polyamide resin consisting essentially of the mixed polyacyl groups of a polymeric fat acid and a 3 to 8 carbon atom dicarboxylic acid free from ethylenic unsaturation and the diamino groups of an alkylene diprimary diamine, said mixed polyacyl groups resulting from a ratio of 85% to 98% by weight of said polymeric fat acid to 2% to 15% by weight of said dicarboxylic acid, and subjecting said blend to a temperature of 392° F. to 450° F. for a time of about 1 hour to 16 hours, the longer time being used with the lower temperature.

6. A process comprising heating to a temperature of from 400° F. to 420° F. in an inert atmosphere and thereby melting a polyamide resin A consisting essentially of the polyacyl group of dilinoleic acid and the triamino groups of diethylene triamine, adding to said molten resin with constant agitation a polyamide resin B consisting essentially of the mixed polyacyl groups of dilinoleic acid and sebacic acid and the diamino groups of ethylene diamine to form a blend, said mixed polyacyl groups resulting from a ratio of 90% of said dilinoleic acid to 10% of said sebacic acid, said blend containing 50% to 75% of said polyamide resin A and 25% to 50% of said polyamide resin B, and subjecting the blend to a temperature of about 424° F. for a time of about 1 hour, 45 minutes and thereafter for an additional 35 minutes while said temperature decreases to about 400° F.

7. A plurality of metal layers having the composition of claim 1 between adjacent surfaces thereof as a bonding material therefor.

8. A metal container having the composition of claim 1 enclosed within the side seam thereof as the bonding material therefor.

References Cited in the file of this patent

UNITED STATES PATENTS

| | | |
|---|---|---|
| 2,450,940 | Cowan et al. | Oct. 12, 1948 |
| 2,728,737 | Wittcoff | Dec. 27, 1955 |